United States Patent
Koay et al.

(10) Patent No.: US 7,280,099 B2
(45) Date of Patent: Oct. 9, 2007

(54) REGULATING A LIGHT SOURCE IN AN OPTICAL NAVIGATION DEVICE

(75) Inventors: Ban Kuan Koay, Penang (MY); Fook Main Heng, Penang (MY); Boon How Kok, Penang (MY)

(73) Assignee: Avago Technologies ECBU IP (Singapore) Pte Ltd, Singapore (SG)

( * ) Notice: Subject to any disclaimer, the term of this patent is extended or adjusted under 35 U.S.C. 154(b) by 710 days.

(21) Appl. No.: 10/767,508

(22) Filed: Jan. 28, 2004

(65) Prior Publication Data

US 2005/0162375 A1    Jul. 28, 2005

(51) Int. Cl.
*G09G 5/08* (2006.01)

(52) U.S. Cl. .................. 345/163; 345/156; 345/166; 345/102

(58) Field of Classification Search ........ 345/156–167, 345/168–170, 172–177, 182–183, 102; 382/312–313, 382/321
See application file for complete search history.

(56) References Cited

U.S. PATENT DOCUMENTS 7,168,047 B1 *   1/2007   Huppi ..................... 715/784
2005/0162389 A1 *  7/2005  Obermeyer et al. ........ 345/161

FOREIGN PATENT DOCUMENTS

EP     1 096 778 A2    5/2001

\* cited by examiner

*Primary Examiner*—Richard Hjerpe
*Assistant Examiner*—Mansour M. Said (57) ABSTRACT

An optical navigation device that regulates the brightness of an adjustable light source, and a method thereof, are described. Light from the light source is emitted onto a surface and reflected from the surface to a sensor. The light received by the sensor is used to measure movement of the optical navigation device relative to the surface. A light-sensitive device also receives light from the light source. The brightness of the light source can be adjusted according to the amount of light received at the light-sensitive device.

23 Claims, 4 Drawing Sheets

REGULATING A LIGHT SOURCE IN AN OPTICAL NAVIGATION DEVICE

FIELD

Embodiments of the present invention relate to optical navigation devices.

BACKGROUND

An optical navigation device, such as an optical mouse, conventionally uses a light-emitting diode (LED) to broadcast light onto a surface. The light is reflected off the surface to a sensor. The reflection of the light produces a pattern that is captured by the sensor. The sensor can include, for example, a complementary metal-oxide semiconductor (CMOS) imager array. As an optical navigation device is moved relative to the surface (or vice versa), successive images (frames) are rapidly captured and compared to measure the amount of movement. The difference between successive images indicates the amount of movement. Optical navigation devices such as those described herein operate at frame rates of 1500 frames per second or more. Thus, relatively small amounts of movement can be detected and measured.

The amount of time needed by the optical navigation device (specifically, the sensor/imager) to capture an image is referred to as the exposure time. For example, on a difficult surface such as a dark surface, a longer exposure time may be needed to capture images at a resolution that is high enough to discern movement of the optical navigation device. Conventional devices use the "squal" (surface quality) value to determine exposure time. A squal value can be calculated for each frame. When the squal value decreases, the exposure time is increased.

A problem with conventional optical navigation devices is that the LED light source can degrade over time. The amount of light emitted by the LED, referred to herein as the brightness of the LED, can decrease with time. The reduction in brightness can cause a reduction in the squal value and hence an increase in the exposure time.

As exposure time is increased, frames are captured less frequently, which has a deleterious effect on the tracking performance of the optical navigation device. With longer exposure times, some movements may not be detected or the movement of a cursor may appear less smooth, for example.

The impact of a longer exposure time on tracking performance may be noticeable on a good surface, but it is especially noticeable on a difficult surface. That is, the exposure time may already be increased to cope with a difficult surface, and the decrease in LED performance can lead to a further increase in exposure time and a greater impact on tracking performance.

In summary, the performance of an optical navigation device can be diminished by degradation of the LED. Small movements of the device may not be detected. Movement of the cursor on a display screen may be more jumpy in appearance. As the LED degrades, the user can become less satisfied with the performance of the optical navigation device and may be forced into the purchase of a new device. Therefore, an optical navigation device that addresses the problems caused by LED degradation would be advantageous.

SUMMARY

Embodiments of the present invention pertain to optical navigation devices that regulate the brightness of an adjustable light source and methods used by such devices for regulating the brightness of an adjustable light source. In one embodiment, light from the light source is emitted onto a surface and reflected from the surface to a sensor. The light received by the sensor is used to measure movement of the optical navigation device relative to the surface. A light-sensitive device also receives light from the light source. The light-sensitive device regulates the light emitted from the light source according to the amount of light received at the light-sensitive device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to various embodiments of the invention, examples of which are illustrated in the accompanying drawings. The drawings referred to in this description should not be understood as being drawn to scale except if specifically noted.

Figure 1:
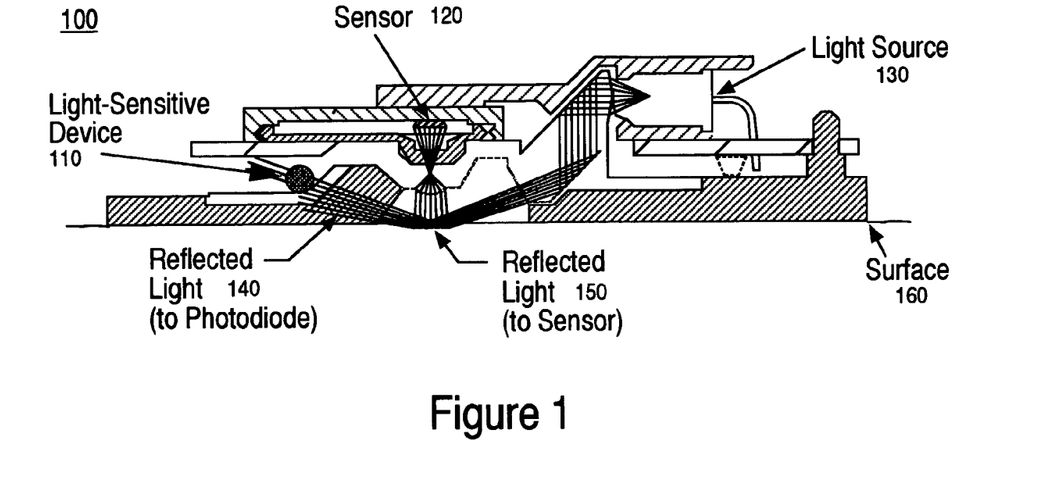
FIG. 1 is a cross-sectional perspective view of an optical navigation device according to one embodiment of the present invention.

FIG. 1 is a cross-sectional perspective view of an optical navigation device 100 according to one embodiment of the present invention. Optical navigation device 100 can be a cursor control or directing device such as an optical mouse, for example. Optical navigation device 100 can include elements other than those illustrated and described herein.

In the present embodiment, optical navigation device 100 includes a light-sensitive device 110, a sensor 120, and a light source 130. In one embodiment, light-sensitive device 110 is a photodiode. Light-sensitive device 110 may be a gallium-arsenide-phosphate (GaAsP) photodiode or a silicon photodiode, for example. In one embodiment, light source 130 is a light-emitting diode (LED). In one embodiment, sensor 120 includes, for example, a charge-coupled device (CCD) or a complementary metal-oxide semiconductor (CMOS) sensor array (e.g., sensor array 222 of FIG. 2). Sensor 120 can include other elements, such as but not limited to circuitry and other electronics related to an imaging system.

In one embodiment, light is emitted by light source 130 of FIG. 1 and reflected off of a surface 160 to light-sensitive device 110 and to sensor 120. That is, some portion (150) of the light emitted by light source 130 is reflected to sensor 120, and another portion (140) of the light is reflected to light-sensitive device 110 due to, for example, the natural scatter of light off of the surface 160. In another embodiment, light from light source 130 is received directly into light-sensitive device 110. For example, light-sensitive device 110 may be positioned to receive light directly from light source 130, without relying on reflection of the light from the surface 160.

Light that is received by sensor 120 is used to detect and/or measure relative movement between the optical navigation device 100 and the surface 160. For example, the reflection of the light produces a pattern that is captured by the sensor 120. As optical navigation device 100 is moved relative to a surface 160 (or vice versa), successive images (frames) are rapidly captured and compared to measure the amount of movement. The difference between successive images indicates the amount of movement.

In the present embodiment, light that is received by the light-sensitive device 110 is used to regulate the level of light (or the amount of light or the brightness of the light) emitted by light source 130. This feature is described further in conjunction with the figures below.

Figure 2:
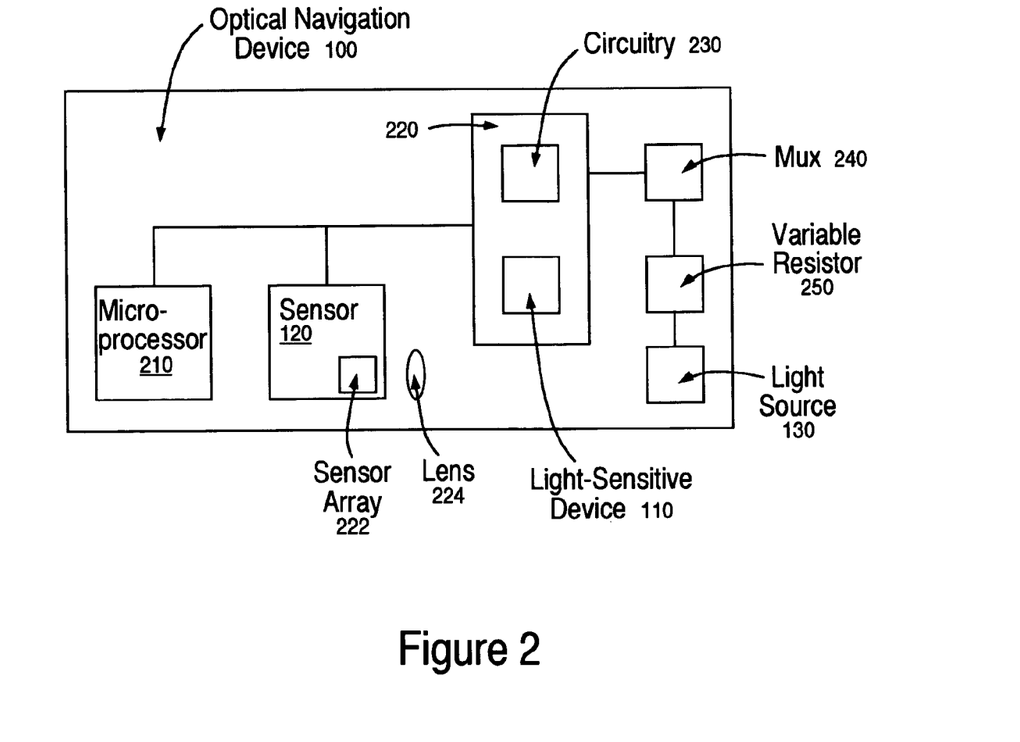
FIG. 2 is a functional block diagram of an optical navigation device according to one embodiment of the present invention.

FIG. 2 is a functional block diagram of optical navigation device 100 according to one embodiment of the present invention. In the present embodiment, in addition to the elements described above, optical navigation device 100 includes a microprocessor 210, a light-regulating device 220, a multiplexer (MUX) 240, and one or more variable resistors 250. In the present embodiment, light-regulating device 220 includes light-sensitive device 110 and circuitry block 230.

In one embodiment, a portion of the light from light source 130 is reflected from a surface and passes through lens 224 to sensor array 222 of sensor 120. Under control of microprocessor 210, the light received at sensor 120 is used to mathematically determine the direction and magnitude of movement of the optical navigation device 100 by comparing successive images captured by sensor array 222.

Another portion of the light from light source 130 is reflected from the surface to light-sensitive device 110. Alternatively, light from light source 130 may be broadcast directly to light-sensitive device 110. Light-sensitive device 110 generates an output that is indicative of the level of light received by light-sensitive device 110. In one embodiment, light-sensitive device 110 is a photodiode that generates an electrical current that flows to circuitry block 230. The amount of current generated by light-sensitive device 110 is related to the amount of light received by light-sensitive device 110. For example, a reduction in the amount of light received by light-sensitive device 110 would result in a reduction in the amount of current generated by light-sensitive device 110.

In general, circuitry block 230 compares the output of light-sensitive device 110 to a threshold. In one embodiment, the circuitry block 230 converts the current generated by light-sensitive device 110 into a voltage and compares that voltage to a threshold voltage. This is described further in conjunction with FIG. 4, below.

In the present embodiment, circuitry block 230 of FIG. 2 generates an output signal (referred to herein as DOUT) that is indicative of the result of the comparison between the output of light-sensitive device 110 and the threshold. In one embodiment, the output signal DOUT is a digital signal expressed as a zero or a one. For example, if the output of the light-sensitive device 110 meets or exceeds the threshold, the output signal DOUT is set to high (e.g., one), but if the output of the light-sensitive device 110 is less than the threshold, then the output signal DOUT would be set to low (e.g., zero).

In the present embodiment, the output signal DOUT is input to multiplexer 240 of FIG. 2. In one embodiment, circuitry block 230 receives control signals referred to herein as D0 and D1. These control signals are described more fully in conjunction with FIG. 4, below. The control signals D0 and D1 are also input to multiplexer 240.

Multiplexer 240 of FIG. 2 multiplexes the output signal DOUT and the control signals D0 and D1. In the present embodiment, the multiplexed signal from multiplexer 240 is used to regulate a variable resistor 250 that is electrically coupled to light source 130. The resistance of variable resistor 250 can be changed as a function of the value of the digital signal received from multiplexer 240.

By changing the resistance of variable resistor 250, the amount of current delivered to light source 130 can be regulated (e.g., increased, decreased or not changed). By increasing the current to light source 130, the amount of light emitted by light source 130 can be increased; that is, light source 130 can be made brighter. By decreasing the current to light source 130, the amount of light emitted by light source 130 can be decreased.

In overview, optical navigation device 100 of FIG. 2 functions as follows to regulate the amount of light emitted by light source 130. Consider an example in which light source 130 degrades with time, so that the amount of light emitted by light source 130 diminishes as the light source gets older. As the amount of light from light source 130 decreases, less light will be received by light-sensitive device 110. Circuitry block 230 compares the amount of light received by light-sensitive device to a threshold. Specifically, in one embodiment, circuitry block 230 converts a current generated by light-sensitive device 110 to a voltage and compares that voltage to a threshold voltage. Should the threshold not be met, variable resistor 250 can be adjusted so that additional current is provided to light source 130. Consequently, light source 130 will emit a greater amount of light. Therefore, even though light source 130 has possibly degraded, the amount of light emitted by light source 130 and the amount of light received by sensor 120 will not diminish as a result.

Thus, according to embodiments of the present invention, degradation of light source 130 is counteracted by increasing the current to the light source 130. Consequently, the amount of light emitted by light source 130 does not decrease as the light source ages. Accordingly, the surface quality (squal) value for optical navigation device 100 will not decrease with time, and exposure times do not need to be increased. Frames rates do not have to be decreased to account for an increase in exposure time, and so the tracking performance of optical navigation device 100 is not decreased. Thus, according to the embodiments of the present invention, degradation of light source 130 does not impact the performance of optical navigation device 100.

Consider next an example in which optical navigation device 100 is moved from a good surface to a difficult surface (e.g., a darker surface). On the difficult surface, less light may be reflected from light source 130 to sensor 120. Conventionally, this might affect the squal value, causing an increase in exposure time and perhaps a reduction in tracking performance. However, according to embodiments of the present invention, light-sensitive device 110 will also receive less reflected light from light source 130. As a result, using the mechanisms described above, the amount of light emitted by light source 130 can be increased. Thus, even on difficult surfaces, the amount of light received by sensor 120 is not reduced, and the tracking performance of optical navigation device 100 is also not reduced.

Now consider an example in which optical navigation device 100 is moved from a difficult surface to a good surface. As a result, sensor 120 and light-sensitive device 110 will receive a greater amount of light, as more light from light source 130 will be reflected from the good surface than from the difficult surface. Using the mechanisms described above, the amount of light emitted by light source 130 can be decreased. Consequently, light source 130 will consume less power. This can be particularly advantageous when optical navigation device 100 is a wireless device that is powered by a battery, for example. With light source 130 consuming less power, battery life is extended, so that batteries do not have to be replaced as often or optical navigation device 100 can operate longer between recharges.

Figure 3:
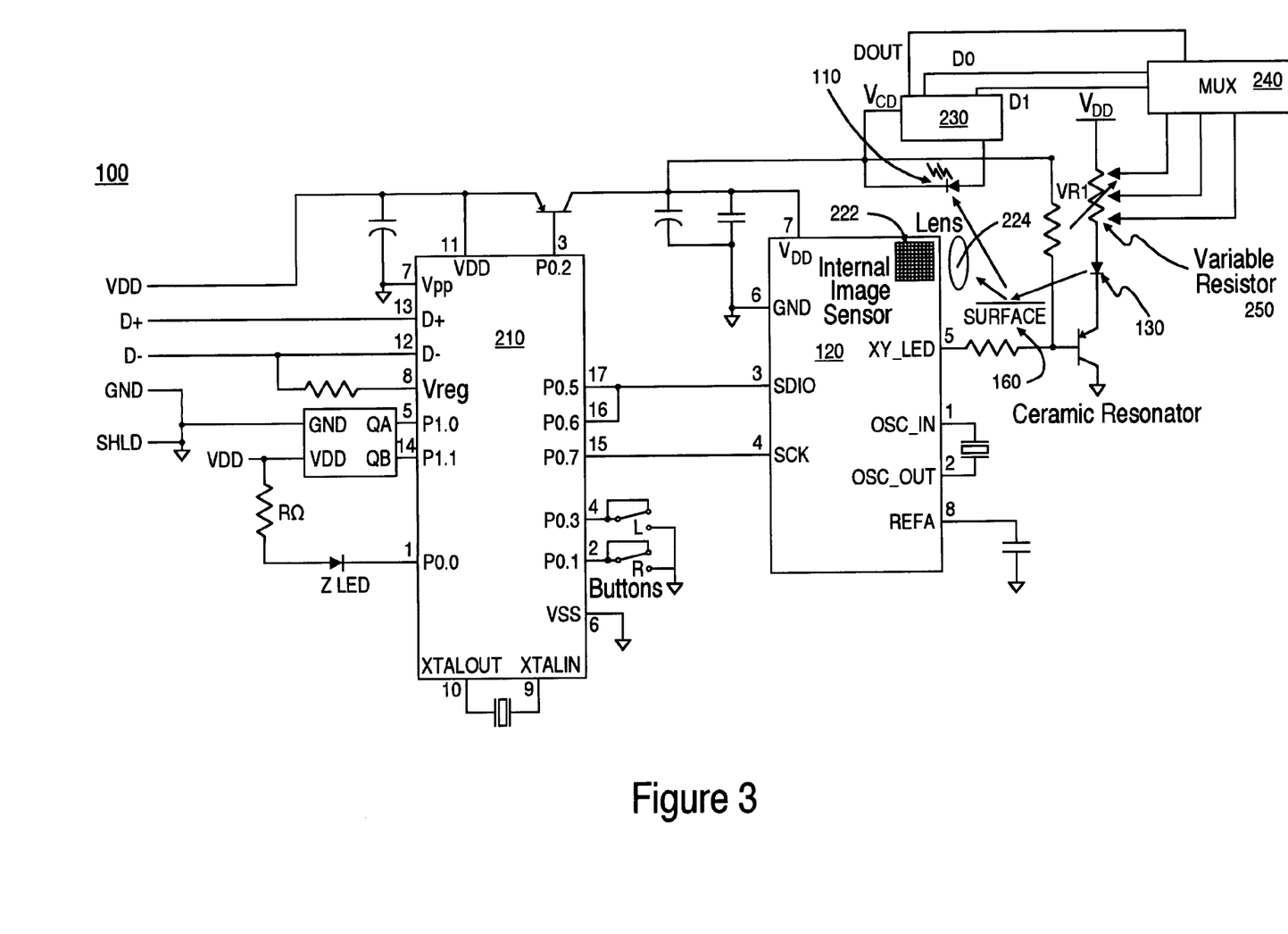
FIG. 3 is a circuit block diagram of an optical navigation device according to one embodiment of the present invention.

FIG. 3 is a circuit block diagram of an optical navigation device 100 according to one embodiment of the present invention. FIG. 3 provides one example of a configuration that can be used by an optical navigation device; however, the present invention is not so limited.

FIG. 3 shows the output signal DOUT and the control signals D0 and D1 provided as inputs to multiplexer 240 from circuitry block 230. In the embodiment of FIG. 3, light-sensitive device 110 is a photodiode and light source 130 is a light-emitting diode. In the present embodiment, light emitted by light source 130 is reflected from surface 160 to sensor 120 and to light-sensitive device 110.

Figure 4:
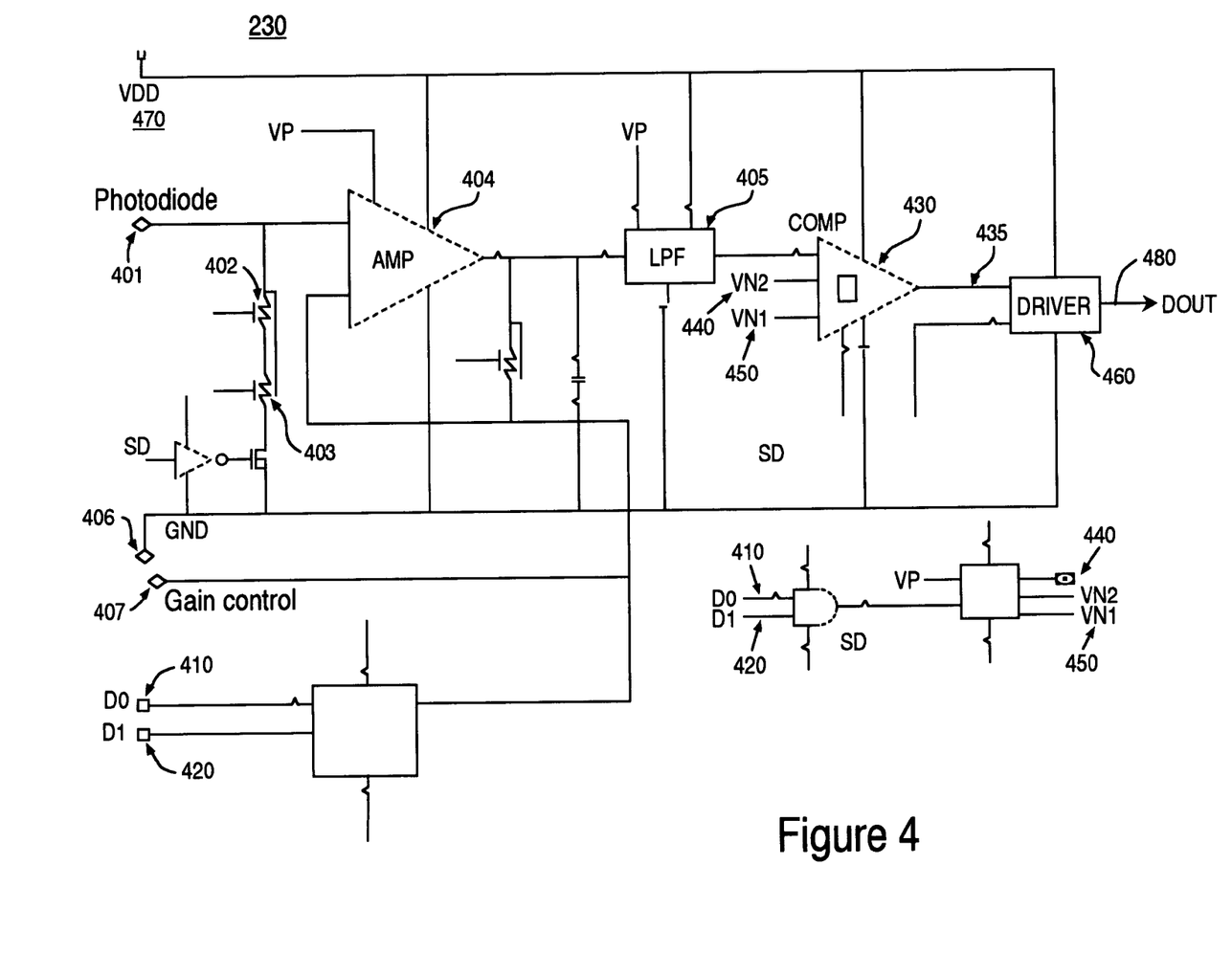
FIG. 4 is a diagram illustrating features of an integrated circuit used in an optical navigation device according to one embodiment of the present invention.

FIG. 4 is a diagram illustrating features of circuitry block 230 (e.g., an integrated circuit) used in an optical navigation device according to one embodiment of the present invention. FIG. 4 provides one example of a circuit that can be used by an optical navigation device; however, the present invention is not so limited.

In one embodiment, circuitry block 230 is implemented using a semiconductor process such as a 0.6 μm BICMOS (combined bipolar and CMOS) process. In such an embodiment, circuitry block 230 will consume an idle current of approximately 30 μA and can be fully shut down to approximately 10 nA. Embodiments of the present invention are well-suited to other semiconductor processes.

In the present embodiment, a current corresponding to the light received by light-sensitive device 110 of FIGS. 1-3 (e.g., a photodiode) is accessed at node 401 of FIG. 4. The resistors 402 and 403 convert the current at node 401 into a respective voltage. The characteristics of resistors 402 and 403 are selected so that the voltage generated from the current at node 401 is commensurable with the threshold voltage.

Amplifier (AMP) 404 amplifies the voltage signal. The control signals 401 and 420 (D0 and D1) are used to select (adjust) the amplifier gain. For example, when D0 and D1 are both zero, the gain of amplifier 404 is set to its maximum. When D0 and D1 are both one, electronic circuit 230 can be shut down. The lowest gain occurs with D0 and D1 equal to one and zero. At the lowest gain, a small signal can switch DOUT to high (e.g., one), meaning that the threshold voltage is satisfied by the current received at node 401 (the current received from light-sensitive device 110 of FIGS. 1-3).

Continuing with reference to FIG. 4, the amplified signal is passed through low pass filter (LPF) 405. Comparator 430 compares the amplified and filtered voltage to a threshold voltage. In the present embodiment, circuit 230 provides the capability for more than one threshold voltage (e.g., VN1 450 or VN2 440). If the capability for more than one threshold voltage is provided, the threshold voltage to be used for the comparison can be selected using control signals 410 and 420 (D0 and D1). However, circuit block 230 can be configured for a single threshold voltage. The threshold voltage selected for use is a design consideration that can be derived by a calibration process, for example.

The output of comparator 430 (signal 435) indicates if the light received by light-sensitive device 110 (FIGS. 1-3) is greater than or less than the threshold. Driver 460 drives and buffers signal 435 to provide a signal 480 (DOUT) compatible with voltage and drive levels of downstream digital logic, e.g., multiplexer 240 of FIGS. 2 and 3. Driver 460 obviates the need for an analog-to-digital converter.

In the present embodiment, circuitry block 230 also includes a node 470 for the supply voltage VDD and a node 406 for the ground. Node 407 is for gain constant control and provides an analog gain option in addition to the gain control provided by signals 410 and 420 (D0 and D1).

Figure 5:
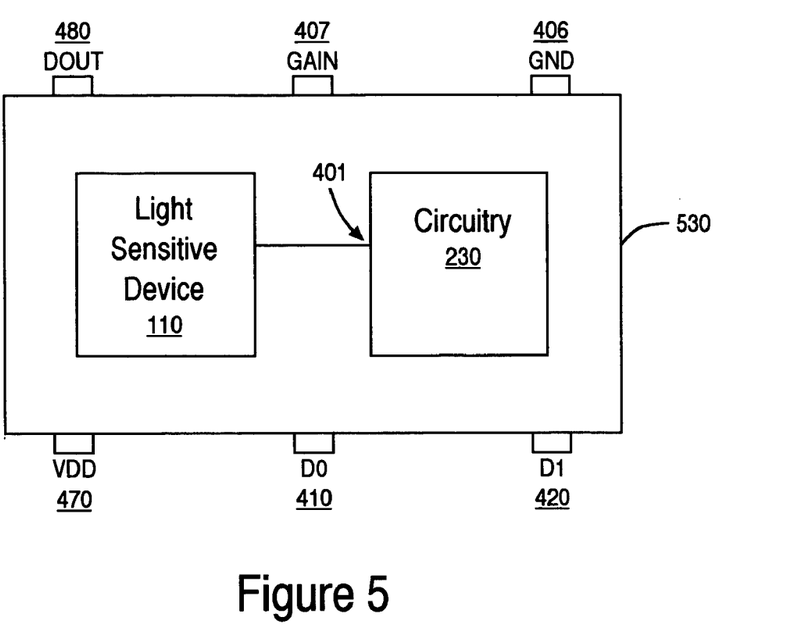
FIG. 5 is a functional block diagram of a package incorporating an integrated circuit and a light-sensitive device according to one embodiment of the present invention.

FIG. 5 is a functional block diagram of a package 530 incorporating an integrated circuit (e.g., circuitry block 230) and a light-sensitive device 110 (e.g., a photodiode) according to one embodiment of the present invention. However, it to be appreciated that light-sensitive device 110 need not be mounted in the same package as circuitry block 230. In the present embodiment, package 530 has six leads corresponding to the supply voltage (VDD) 470, the control signals 410 and 420 (D0 and D1), the output signal 480 (DOUT), the gain constant control 407, and the ground (GND) 406.

Package 530 is well-suited to conventional semiconductor packaging as well as other forms of packaging. For example, circuitry block 230 may be mounted to a printed circuit board by various means, such as but not limited to direct chip attach.

Combining light-sensitive device 110 and circuitry block 230 in package 530 means that they can be located close to each other to minimize electrical noise. Combining circuitry block 230 and light-sensitive device 110 into a package 530 has other advantages as well. Characteristics of circuitry block 230 (e.g., amplifier gain) can be chosen to match characteristics of light-sensitive device 110. In addition, handling of a single package during manufacturing, for example, is faster, more reliable and offers greater economy. Furthermore, interconnects between circuitry block 230 and light-sensitive device 110 can be made shorter. Shorter interconnects save printed circuit board wiring channels, which are often a critical resource within battery-powered devices.

Figure 6:
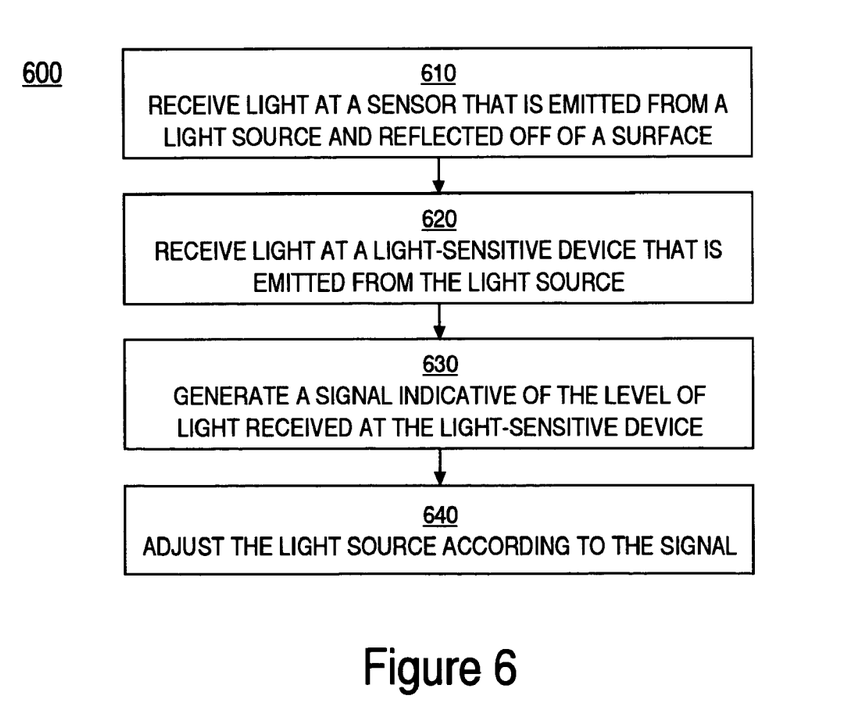
FIG. 6 is a flowchart of an optical navigation method according to one embodiment of the present invention.

FIG. 6 is a flowchart 600 of an optical navigation method according to one embodiment of the present invention. Although specific steps are disclosed in flowchart 600, such steps are exemplary. That is, embodiments of the present invention are well suited to performing various other or additional steps or variations of the steps recited in flowchart 600. It is appreciated that the steps in flowchart 600 may be performed in an order different than presented.

In step 610, light emitted by a light source and reflected from a surface is received at a sensor. The light received at the sensor is used to measure movement of an optical navigation device relative to the surface.

In step 620, light is received at a light-sensitive device. The light received at the light-sensitive device is also emitted by the light source. In one embodiment, the light received at the light-sensitive device is reflected from the surface.

In step 630, in one embodiment, the light-sensitive device generates a signal indicative of the level of light received at the light-sensitive device.

In step 640, the light source is regulated according to a level of light received at the light-sensitive device. In one embodiment, the signal of step 630 is compared to a threshold level, and the light source is adjusted according to the result of the comparison. In one such embodiment, the signal of step 630 is converted from an electrical current into a voltage, and that voltage is compared to a threshold voltage. The electrical current can be amplified according to a selectable amplifier gain.

If the threshold is satisfied (e.g., met or exceeded), the light source is not adjusted. If the threshold is not satisfied, then the light source is adjusted so that it will emit more light. In one embodiment, the light source is adjusted by increasing the current to the light source using a variable resistor.

In one embodiment, a signal is set to high or low depending on whether or not the threshold is satisfied. The variable resistor can be regulated according to the value of that signal. In one embodiment, the variable resistor is also regulated according to the values of control signals used to select the selectable amplifier gain.

Embodiments of the present invention are thus described. While the present invention has been described in particular embodiments, it should be appreciated that the present invention should not be construed as limited by such embodiments, but rather construed according to the following claims.

What is claimed is:

1. An optical navigation device comprising:
   an adjustable light source disposed to emit light onto a surface;
   a sensor disposed to receive light reflected from said surface, wherein light received by said sensor is used to measure movement of said optical navigation device relative to said surface; and
   a light-sensitive device coupled to said light source, said light-sensitive device disposed to receive light from said light source to regulate light emitted from said light source according to a level of light received at said light-sensitive device.

2. The optical navigation device of claim 1 wherein light received by said light-sensitive device is reflected from said surface.

3. The optical navigation device of claim 1 wherein said light-sensitive device generates an output indicative of said level of light received by said light-sensitive device, wherein said light source is adjusted according to said output.

4. The optical navigation device of claim 3 further comprising circuitry coupled to said light-sensitive device, said circuitry receiving said output and comparing said output to a threshold level, wherein said light source is adjusted according to a result of said comparing.

5. The optical navigation device of claim 4 wherein said output from said light-sensitive device comprises an electrical current and wherein said threshold level comprises a threshold voltage, wherein said circuitry converts said electrical current into a voltage that is compared to said threshold voltage.

6. The optical navigation device of claim 5 wherein said circuitry further comprises a selectable gain for application to said electrical current.

7. The optical navigation device of claim 4 wherein said result of said comparing regulates a variable resistor coupled to said light source, said variable resistor regulating said light source.

8. The optical navigation device of claim 1 wherein said light source comprises a light-emitting diode.

9. The optical navigation device of claim 1 wherein said light-sensitive device comprises a photodiode.

10. An optical navigation method comprising:
    receiving a light at a sensor, said light emitted by a light source and reflected from a surface, wherein light received at said sensor is used to measure movement of an optical navigation device relative to said surface;
    receiving light at a light-sensitive device, wherein light received by said light-sensitive device is also emitted by said light source; and
    regulating said light source according to a level of light received at said light-sensitive device.

11. The optical navigation method of claim 10 wherein light received at said light-sensitive device is reflected from said surface.

12. The optical navigation method of claim 10 wherein said regulating further comprises:
    generating a signal indicative of said level of light received at said light-sensitive device; and
    adjusting said light source according to said signal.

13. The optical navigation method of claim 12 further comprising:
    comparing said signal to a threshold level; and
    making an adjustment to said light source according to a result of said comparing.

14. The optical navigation method of claim 13 wherein said comparing further comprises:
    converting said signal from an electrical current into a voltage; and
    comparing said voltage to a threshold voltage.

15. The optical navigation method of claim 14 wherein said converting further comprises:
    amplifying said electrical current according to a selectable amplifier gain.

16. The optical navigation method of claim 13 wherein said making an adjustment further comprises:
    regulatIng a variable resistor according to said result of said comparing. wherein said variable resistor regulates said light source.

17. The optical navigation method of claim 10 wherein said light source comprises a light-emitting diode and said light-sensitive device comprises a photodiode.

18. An ontical navigation device comprising:
    a light source that emits light onto a surface, wherein light reflected from said surface is used by said optical navigation device to detect movement relative to said surface; and
    a light-regulating device coupled to said light source to measure light reflected from said surface so as to regulate light emitted from said light source, said light regulating device comprising a light-sensitive device to generate an output having a magnitude that corresponds to a level of light received by said light-sensitive device from said light source; and
    an electronic circuit coupled to said light-sensitive device, said electronic circuit comparing said output to a threshold and generating an output signal that indicates whether or not said threshold is met.

19. The optical navigation device of claim 18 further comprising:

a variable resistor coupled between said electronic circuit and said light source, said variable resistor adjusted using said output signal, said variable resistor used for regulating a level of light emitted by said light source.

20. The optical navigation device of claim 18 wherein said light source comprises a light-emitting diode and said light-sensitive device comprises a photodiode.

21. The optical navigation device of claim 18 wherein said output of said lighbsensitive device comprises an electrical current and wherein said threshold comprises a threshold voltage, wherein said electronic circuit converts said electrical current into a voltage for comparison to said threshold voltage.

22. The optical navigation device of claim 21 wherein said electronic circuit further comprises a selectable gain applied to said electrical current, wherein said selectable gain is selected using a control signal.

23. The optical navigation device of claim 22 further comprising a multiplexer coupled between said electronic circuit and said variable resistors, said multiplexer multiplexing said output signal and said control signal, wherein said variable resistor is regulated using said multiplexed output and control signals.

* * * * *

UNITED STATES PATENT AND TRADEMARK OFFICE
CERTIFICATE OF CORRECTION

| | | |
|---|---|---|
| PATENT NO. | : 7,280,099 B2 | Page 1 of 1 |
| APPLICATION NO. | : 10/767508 | |
| DATED | : October 9, 2007 | |
| INVENTOR(S) | : Ban Koay | |

It is certified that error appears in the above-identified patent and that said Letters Patent is hereby corrected as shown below:

Col. 8 Line 44 In Claim 16, delete "regulatlng" and insert -- regulating --, therefor.

Col. 8 Line 45 In Claim 16, after "comparing" delete "." and insert -- , --, therefor.

Col. 8 Line 50 In Claim 18, delete "ontical" and insert -- optical --, therefor.

Col. 9 Line 9 In Claim 21, delete "lighbsensitive" and insert -- light-sensitive --, therefor.

Signed and Sealed this

Seventeenth Day of February, 2009

JOHN DOLL
*Acting Director of the United States Patent and Trademark Office*